(12) United States Patent
Jang et al.

(10) Patent No.: US 9,264,622 B2
(45) Date of Patent: Feb. 16, 2016

(54) APPARATUS AND METHOD TO PROVIDE A LIVE VIEW WHILE PHOTOGRAPHING AN IMAGE

(71) Applicant: Samsung Electronics Co., Ltd, Suwon-si, Gyeonggi-do (KR)

(72) Inventors: Jae-young Jang, Suwon-si (KR); Shuichi Shimokawa, Suwon-si (KR); Hisashi Tatamiya, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 111 days.

(21) Appl. No.: 13/932,108

(22) Filed: Jul. 1, 2013

(65) Prior Publication Data

US 2014/0028877 A1    Jan. 30, 2014

(30) Foreign Application Priority Data

Jul. 25, 2012    (KR) .......................... 10-2012-0081271

(51) Int. Cl.
*H04N 5/225* (2006.01)
*H04N 5/228* (2006.01)
*H04N 5/222* (2006.01)
*H04N 5/232* (2006.01)

(52) U.S. Cl.
CPC ........... *H04N 5/23293* (2013.01); *H04N 5/225* (2013.01)

(58) Field of Classification Search
CPC ............. H04N 5/2355; H04N 5/2353; H04N 5/35581; H04N 5/35572; H04N 5/355; H04N 5/35545

USPC ................... 348/333.01–333.13, 220.1–230.1
See application file for complete search history.

(56) References Cited

U.S. PATENT DOCUMENTS 6,046,772 A  *  4/2000  Howell ........................ 348/273
6,292,218 B1 *  9/2001  Parulski et al. ............ 348/220.1
7,989,745 B2    8/2011  Suzuki
(Continued)

FOREIGN PATENT DOCUMENTS

KR    10-2009-0079082    7/2009
KR    10-2011-0051344    5/2011
(Continued)

OTHER PUBLICATIONS

PCT Search Report and Written Opinion issued in Application No. PCT/KR2013/006609 on Nov. 26, 2013.
(Continued)

*Primary Examiner* — Chia-Wei A Chen
(74) *Attorney, Agent, or Firm* — Staas & Halsey LLP (57) ABSTRACT

A photographing apparatus, and a photographing method thereof. The photographing method of the photographing apparatus determines if an instruction to photograph is input, and if the instruction to photograph is input, displays a live view by using a first data output from a first pixel group included in an image sensor, and combines a second data output from a second pixel group included in the image sensor with the first data and generates a photographed image, and stores the generated photographed image. Accordingly, the user is continuously provided with the live view even after photographing. Specifically, in continuous photographing, since the user is provided with the live view through which he or she can check the moving subject of photography, the user is enabled to compose images as he or she wishes.

17 Claims, 9 Drawing Sheets

(56) References Cited

U.S. PATENT DOCUMENTS

| | | | |
|---|---|---|---|
| 8,243,189 B2* | 8/2012 | Kusaka | 348/350 |
| 2003/0193600 A1* | 10/2003 | Kitamura et al. | 348/333.01 |
| 2006/0267989 A1 | 11/2006 | Campbell et al. | |
| 2007/0146529 A1* | 6/2007 | Suzuki | 348/333.01 |
| 2007/0229699 A1* | 10/2007 | Hamamura et al. | 348/362 |
| 2008/0007643 A1* | 1/2008 | Okumura | 348/333.01 |
| 2008/0008465 A1* | 1/2008 | Morimoto | 396/89 |
| 2008/0186387 A1* | 8/2008 | Iwamoto et al. | 348/222.1 |
| 2008/0297622 A1* | 12/2008 | Miyashita | 348/229.1 |
| 2009/0021608 A1* | 1/2009 | Matsumura | 348/240.2 |
| 2009/0051794 A1* | 2/2009 | Ando | 348/274 |
| 2009/0140122 A1* | 6/2009 | Suzuki | 250/201.2 |
| 2009/0256932 A1 | 10/2009 | Morimoto | |
| 2009/0262218 A1* | 10/2009 | Makii | 348/239 |
| 2010/0097479 A1* | 4/2010 | Ohmura | 348/207.1 |
| 2010/0157090 A1* | 6/2010 | Kobayashi et al. | 348/222.1 |
| 2010/0194922 A1* | 8/2010 | Honda et al. | 348/231.99 |
| 2010/0321530 A1* | 12/2010 | Baek | 348/231.99 |
| 2011/0109766 A1 | 5/2011 | Rob et al. | |
| 2011/0149111 A1* | 6/2011 | Prentice et al. | 348/229.1 |
| 2011/0176028 A1* | 7/2011 | Toyoda | 348/223.1 |
| 2011/0234862 A1* | 9/2011 | Ohta | 348/246 |
| 2011/0261228 A1* | 10/2011 | Peng et al. | 348/231.6 |
| 2011/0317032 A1* | 12/2011 | Yamashita et al. | 348/229.1 |
| 2012/0044394 A1* | 2/2012 | Komiya et al. | 348/266 |
| 2012/0057048 A1* | 3/2012 | Kindaichi | 348/231.99 |
| 2012/0172086 A1* | 7/2012 | Choi et al. | 455/556.1 |
| 2012/0206640 A1* | 8/2012 | Nakagawara | 348/345 |
| 2012/0268617 A1* | 10/2012 | Ishikawa | 348/221.1 |
| 2012/0287309 A1* | 11/2012 | Awatani | 348/239 |
| 2012/0287310 A1* | 11/2012 | Fujii et al. | 348/239 |
| 2012/0307101 A1* | 12/2012 | Fukuya et al. | 348/222.1 |
| 2012/0307130 A1* | 12/2012 | Usui | 348/345 |
| 2013/0107066 A1* | 5/2013 | Venkatraman et al. | 348/208.4 |
| 2013/0120642 A1* | 5/2013 | Kim | 348/349 |
| 2013/0155265 A1* | 6/2013 | Bae et al. | 348/208.11 |
| 2013/0258149 A1* | 10/2013 | Choi et al. | 348/294 |
| 2013/0286249 A1* | 10/2013 | Yost et al. | 348/231.99 |
| 2013/0314510 A1* | 11/2013 | Endo | 348/49 |
| 2014/0049657 A1* | 2/2014 | Fukunishi | 348/208.4 |
| 2014/0092308 A1* | 4/2014 | Toyoda | 348/578 |
| 2014/0313400 A1* | 10/2014 | Kaizu et al. | 348/362 |

FOREIGN PATENT DOCUMENTS

| | | |
|---|---|---|
| KR | 10-2011-0062448 | 6/2011 |
| KR | 10-2012-0075775 | 7/2012 |
| WF | 2011/065000 | 6/2011 |

OTHER PUBLICATIONS

European Search Report issued in Application No. 13176320.3 on Nov. 4, 2013.

Australian Patent Examination Report dated Jun. 19, 2015 in Australian Patent Application No. 2013293764.

European Examination Report dated Dec. 8, 2015 in European Patent Application No. 12176320.3.

Australian Examination Report dated Oct. 14, 2015 in Australian Patent Application No. 2013293764.

* cited by examiner

APPARATUS AND METHOD TO PROVIDE A LIVE VIEW WHILE PHOTOGRAPHING AN IMAGE

CROSS-REFERENCE TO RELATED APPLICATIONS

This application claims priority from Korean Patent Application No. 10-2012-0081271, filed on Jul. 25, 2012, in the Korean Intellectual Property Office, the disclosure of which is incorporated herein by reference in its entirety.

BACKGROUND OF THE INVENTION

1. Field of the Invention

Apparatuses and methods consistent with the disclosure provided herein relate to photographing an image, and more specifically, to a photographing apparatus to provide a live view while photographing an image, and a photographing method thereof.

2. Description of the Related Art

While photographing an object with a conventional photographing device, a user can view the object displayed on a viewfinder provided in the photographing device and continue photographing. For instance, the subject of photography can be displayed on an optical viewfinder or an electrical viewfinder of the photographing device.

However, if the user watches the object by only using the electrical viewfinder because the optical viewfinder is not provided, he or she may not find the live view for a while after photographing. The photographing devices may need some time to display the quick view by the electrical viewfinder. Particularly, if the continuous photographing is performed, the user is not able to view the frame of the photographed object due to the quick views of the continuously photographed images. The image sensors of the photographing device operate differently to process the live view and to process the photographed image. Accordingly, the user is not provided with the live view during continuous photographing because the operation to process photographed images is performed. Thus, the user is not able to acquire an image of a desired frame or is inconvenienced when he or she has to repeatedly take photographs.

Further, even if the photographing device is provided with the optical viewfinder, if the user photographs continuously at a lower shutter speed than the frame speed of the live view, he or she is not provided with the frame of the object through the optical viewfinder for the duration of the light exposure.

SUMMARY OF THE INVENTION

Exemplary embodiments of the present inventive concept overcome the above disadvantages and other disadvantages not described above. Also, the present inventive concept is not limited to overcoming the disadvantages described above, and some exemplary embodiments of the present inventive concept may not be directed to overcoming any of the problems described above.

Additional features and utilities of the present general inventive concept will be set forth in part in the description which follows and, in part, will be obvious from the description, or may be learned by practice of the general inventive concept.

According to one exemplary embodiment, the present general inventive concept provides a photographing apparatus, wherein a user may be continuously provided with a live view while performing continuous photographing and thus can photograph an image as desired, and a photographing method thereof.

In another exemplary embodiment, the present general inventive concept provides a photographing method of the photographing apparatus, which may include determining whether an instruction to photograph is input, and if the instruction to photograph is input, displaying a live view by using a first data output from a first pixel group included in an image sensor, and combining a second data output from a second pixel group included in the image sensor with the first data and generating a photographed image, and storing the generated photographed image.

The instruction to photograph may be an instruction to perform continuous photographing, and the live view may be continuously displayed during the continuous photographing.

The storing may include, if an instruction to photograph is input, outputting the first data and the second data acquired at the image sensor, signal-processing the first data and temporarily storing the processed first data, and displaying the live view using the processed first data, and combining the second data with the temporarily stored first data to construct full size data, signal-processing the full size data to generate photographed image, and storing the generated photographed image.

The constructing the full size data may include, if the shutter speed is faster than a frame speed of the live view, combining the second data with the first data acquired for the same duration as an exposure time of acquiring the second data to construct the full size data.

If the shutter speed is slower than a frame speed of the live view, the constructing the full size data may include combining the second data with a plurality of first data generated for the same duration as an exposure time of acquiring the second data, to construct the full size data.

The displaying the live view and the storing the photographed image may be performed in parallel.

The first pixel group may include pixels at predetermined intervals from among entire constituent pixels of the image sensor to generate the live view, and the second pixel group may include rest pixels other than the first pixel group of the entire constituent pixels of the image sensor.

In an exemplary embodiment, a photographing apparatus includes an input which receives an instruction to photograph, an image sensor comprising a first pixel group and a second pixel group, an image processor which processes data output by the image sensor, a display which displays the processed image, a storage which stores the processed image, and a controller which displays the live view on the display by using first data output from the first pixel group included in the image sensor, combines second data output from the second pixel group included in the image sensor with the first data to generate the photographed image, and stores the generated photographed image on the storage, if the instruction to photograph is input through the input.

The instruction to photograph may be an instruction to perform continuous photographing, and the live view may be continuously displayed during the continuous photographing.

The image processor may include a first image processor which signal-processes the first data and a second image processor which signal-processes the full size data combining the first data and the second data.

The image sensor may output the acquired first and second data, if the instruction to perform continuous photograph is input through the input, and the controller may control the first image processor to signal-process the first data, temporarily store the signal-processed first data on a buffer, display the live view of the signal-processed first data on the display, combine the second data with the temporarily stored first data to construct the full size data, control the second image processor to signal-process the full size data to generate the photographing image, and store the generated photographing image on the storage.

If the shutter speed is faster than a frame speed of the live view, the controller may combine the second data with first data acquired for the same duration as an exposure time of acquiring the second data, and generate the full size data.

If the shutter speed is slower than a frame speed of the live view, the controller may combine the second data with a plurality of first data acquired for the same duration as an exposure time of acquiring the second data, and generate the full size data.

The controller may perform, in parallel, displaying the live view by using the first data, generating the photographed image by using the full size data, and storing the generated photographed image.

The first pixel group may include pixels at predetermined intervals from among entire constituent pixels of the image sensor to generate the live view, and the second pixel group may include rest pixels other than the first pixel group of the entire constituent pixels of the image sensor.

In an exemplary embodiment, a photographing apparatus includes an photographing apparatus, comprising: an image processor which processes data from a first pixel group and data from a second pixel group; a display which displays the processed data as an image; a storage which stores the processed data; and a controller which displays a live view on the display by using first data output from the first pixel group, combines second data output from the second pixel group with the first data to generate a photographed image, and stores the generated photographed image at the storage, if the instruction to photograph is received.

In an exemplary embodiment, the instruction to photograph is an instruction to perform continuous photographing, and the live view is continuously displayed during the continuous photographing.

In another exemplary embodiment, the image processor comprises: a first image processor which signal-processes the first data; and a second image processor which signal-processes full size data combining the first data and the second data.

In yet another exemplary embodiment, if the instruction to perform continuous photographing is received, the controller controls the first image processor to signal-process the first data, temporarily stores the signal-processed first data at a buffer, displays the live view of the signal-processed first data on the display, combines the second data with the temporarily stored first data to construct the full size data, controls the second image processor to signal-process the full size data to generate the photographing image, and stores the generated photographing image at the storage.

In another exemplary embodiment, the first pixel group comprises pixels at predetermined intervals from among entire constituent pixels of an image sensor to generate the live view, and the second pixel group comprises remaining pixels other than the first pixel group of the entire constituent pixels of the image sensor.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Figure 1:
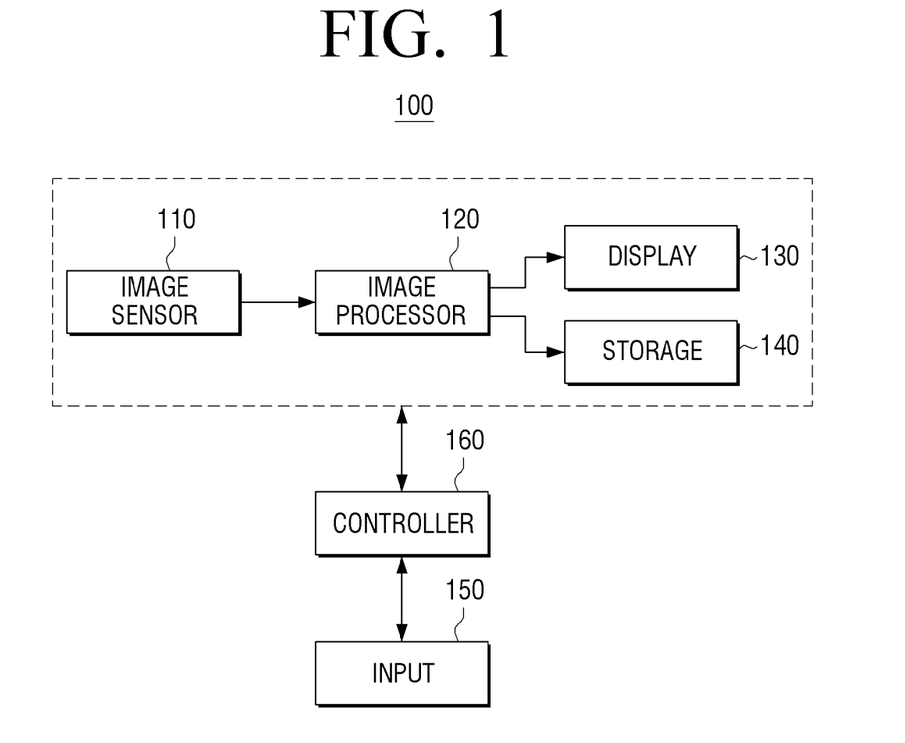
FIG. 1 is a block diagram of a photographing apparatus according to an exemplary embodiment.

FIG. 1 is a block diagram of a photographing apparatus according to an exemplary embodiment. Referring to FIG. 1, the photographing apparatus 100 may include an image sensor 110, an image processor 120, a display 130, a storage 140, an input 150 and a controller 160. The photographing apparatus 100 may be a digital camera; however, this is merely one of the exemplary embodiments, and can alternatively be any mobile device equipped with a photographing function such as, for example, the smartphone, or a tablet PC.

The image sensor 110 may sense the optical signal that enters through the lens by using a plurality of photographing devices, process and convert the sensed optical signal into electrical signals, and output the processed data to the image processor 120.

The image sensor 110 may include a first pixel group to generate the live view and a second pixel group to generate the image photographed by the user. Specifically, the image sensor 110 may generate the first data to generate the live view by using the first pixel group and the second data to generate the photographing image by using the second pixel group.

The image processor 120 may process the signals by using the data output from the image sensor 110, and may display the signal-processed image on the display 130 or store the same at the storage 140.

The image processor 120 may include a first image processor which generates the live view for display on the display 130, and a second image processor which combines the first data and the second data and generates the image photographed by the user (to be described in more detail below). Specifically, the first image processor and the second image processor of the image processor 120 may process each image of the first data and the second data in parallel.

The display 130 may display the optical signal introduced through the lens as the live view, or may display the image photographed according to a user manipulation. The display 130 may be the electrical viewfinder installed in the main body of the photographing apparatus 100.

The storage 140 may store various programs and data to control the photographing apparatus 100. The storage 140 may also store the image photographed by the user.

The input 150 may receive instructions from the user. The input 150 may include a shutter to receive an instruction to start photographing, and a touch screen or a button to change modes or settings of the photographing apparatus 100.

The controller 160 may control the overall operations of the photographing apparatus 100 according to the user's instructions input through the input 150. Specifically, if an instruction to photograph is input from the input 150, the controller 160 may display a live view on the display 130 by using the first data output from the first pixel group included in the image sensor 110, generate the photographed image by combining the second data output from the second pixel group included in the image sensor 110 with the first data, and store the generated photographed image in the storage 140.

Specifically, if an instruction to photograph is input, the controller 160 may output the first data and the second data generated by the image sensor 110 to the image processor 120.

The controller 160 may also process the signals of the first data, temporarily store the processed data, and display the live view on the display 130 by using the signal-processed first data.

The controller 160 may also combine the second data with the temporarily-stored first data, constitute the full size data, process the signals of the full size data, generate the photographing image, and store the photographing image on the storage 140.

Particularly, if an instruction to photograph relates to the continuous photographing, the controller 140 may control the image processor 120 and the display 130 to continuously display the live view generated by the first data while performing the continuous photographing.

As described above, with the photographing apparatus 100 of FIG. 1, the user is provided with the live view continuously even after photographing the image. Specifically, in the continuous photographing, the user is provided with the live view and thus is enabled to check the frame of the photographed object and compose the image as he or she wishes.

Figure 2:
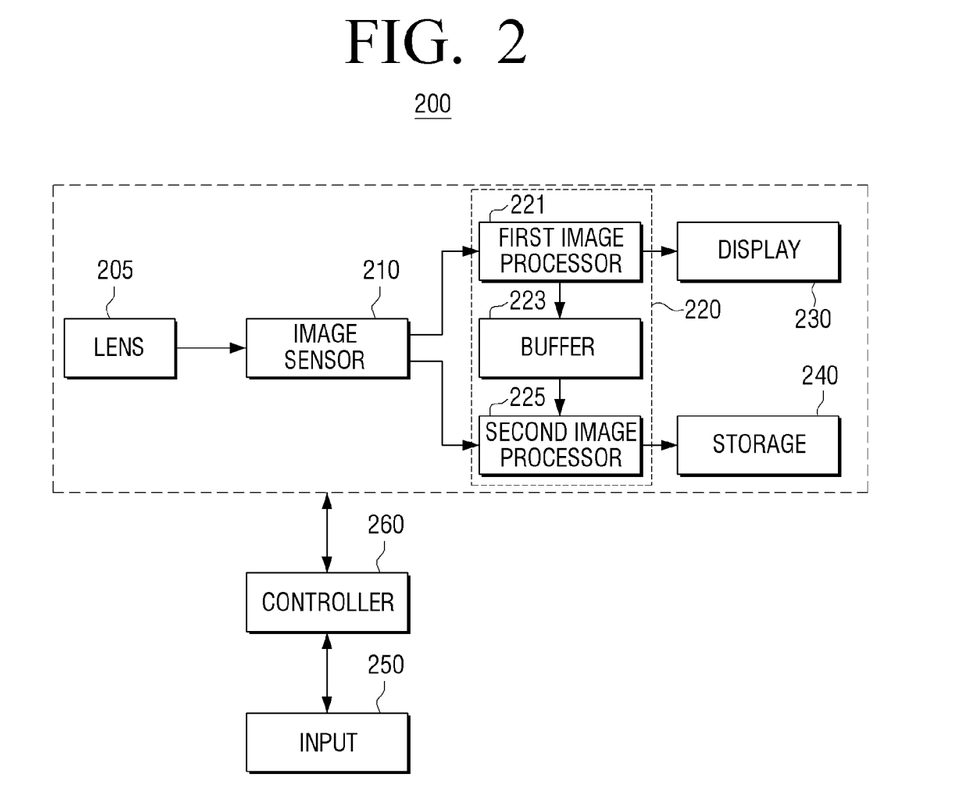
FIG. 2 is a detailed block diagram of a photographing apparatus according to an exemplary embodiment.

FIG. 2 is a detailed block diagram of a photographing apparatus according to an exemplary embodiment. Referring to FIG. 2, the photographing apparatus 200 may include a lens 205, an image sensor 210, an image processor 220, a display 230, a storage 240, an input 250 and a controller 260. The image processor 220 may include a first image processor 221, a buffer 223 and a second image processor 225.

The lens 205 may include a zoom lens which expands or reduces the size of subject of photography, a focus lens which adjusts the focus of the subject, and an aperture to adjust the focus lens and the amount of light. The lens 205 may receive the optical signals from the exterior object.

The image sensor 210 may process and convert the optical signals of a subject introduced through the lens 205 into electrical signals, and transmit the signal-processed data to the image processor 220. Specifically, the image sensor 210 may be a complementary metal oxide semiconductor (CMOS) image sensor, but this is merely an exemplary embodiment. In another embodiment, the image sensor 210 may be a charge coupled device (CCD) image sensor.

The image sensor 210 requires color filters to acquire a color image, and in many cases, utilizes the color filter array (CFA). The CFA has a regularly arranged structure of pixels each permitting light expressing one color, and have varying arrangements. Further, the image sensor 210 may include an ADC which converts analogue image signals to digital data signals.

Figure 3:
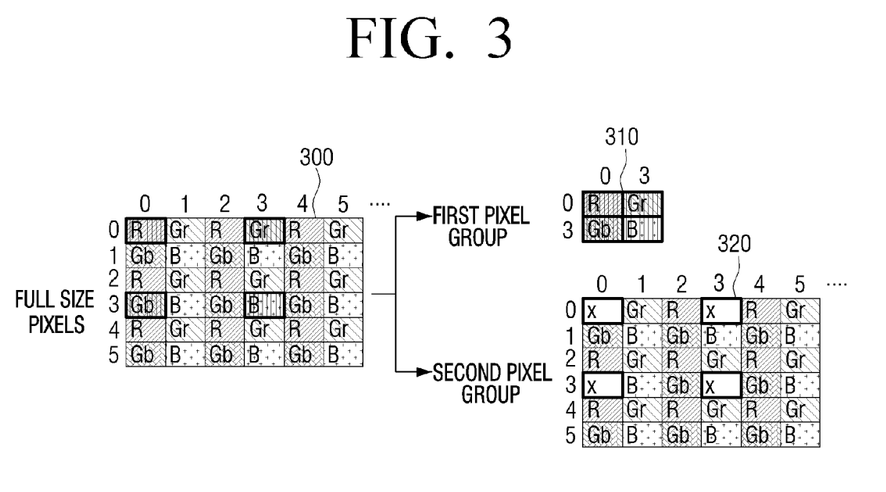
FIG. 3 is a diagram provided to explain a method of operating an image sensor in continuous photographing according to an exemplary embodiment.

Specifically, according to an embodiment, R, G, B pixels of the image sensor 210 may be placed in the matrix as illustrated in FIG. 3. The image sensor 210 in the matrix form may include a live view pixel group 310 (first pixel group) to generate the live view image and an image photographing pixel group 320 (second pixel group) to photograph the image. The first pixel group 310 may comprise pixels at predetermined intervals. For instance, the first pixel group 310 may include pixels at two-pixel intervals in both column and row directions, which may be arranged in the order of R pixel (0,0), Gr pixel (3,0), . . . , Gb pixel (3,0), and B pixel (3,3) (FIG. 3). The second pixel group 320 may comprise the rest of the pixels other than the first pixel group 310 of the entire pixels of the image sensor 210. For instance, referring to FIG. 3, the second pixel group 320 may comprise a Gr pixel (1,0), R pixel (2,0), R pixel (4,0), Gr pixel (5,0), . . . , Gb pixel (0,1), B pixel (1,1), and so on.

Referring to FIG. 3, '1R2S', in which one of all the pixels is read and two pixels are skipped, may be implemented to generate the live view image. FIG. 3 illustrates the first pixel group 310 arranged in 1R2S, but this is merely one of the exemplary embodiments. Alternatively, the first pixel group 310 may be arranged in 2R2S, 1R4S, or 2R4S.

The image sensor 210 may output the first data acquired by the first pixel group 310 to the first image processor 221, and the second data acquired by the second pixel group 320 to the second image processor 225.

According to controlling by the controller 260, the image processor 220 may process the data output from the image sensor controller, and display the live view on the display 230 or store the photographing image at the storage 240.

Specifically, the image processor 220 may include a first image processor 221 to process the first data output from the first pixel group 310, a buffer 223 to temporarily store the processed first data, and a second image processor 225 to process the second data output from the second pixel group 320.

The first image processor 221 may perform pre-processing of the first data. The pre-processing may be the Auto Focusing (AF), Auto White Balancing (AWB), the Auto Exposure (AE), or others. The first image processor 221 may perform the Movie Image Processing (IPC-M) to generate the live view by using the pre-processed first data. The first image processor 221 may output the first data processed with the IPC-M to the display 230. The first image processor 221 may also temporarily store the pre-processed first data at the buffer 223.

The second image processor 225 may combine the input second data with the first data stored at the buffer 223 and generate the full size data. The first and second data may be synchronized as the data generated at the same time. The second image processor 225 may perform the pre-processing of the full size data. As described above, the pre-processing may be the AF, the AWB, the AE, or the others. Further, the second image processor 225 may perform the Still Image Processing (IPC-S). The second image processor may store the full size data completed with the IPC-S on the storage 240.

The display 230 may display the live view by using the first data signal-processed by the first image processor 221. Specifically, if the instruction to photograph continuously is input into the input 250, the display 230 may not display the quick view image of the full size data and instead continuously display the live view image.

The storage 240 may store the image photographed by the user's instruction to photograph. Particularly, the storage 240 may store the image of the full size data combining the first data generated by the first pixel group and the second data generated by the second pixel group.

The input 250 may receive the user's instruction. The input 250 may include a shutter to receive the user's instruction to photograph, a touch screen, a button, or a dial to change the mode of the photographing apparatus 100 and the setting.

The controller 260 may control the overall operation of the photographing apparatus 100 according to the user's instructions input through the input 250. Particularly, if the instruction to photograph is input at the input 250, the controller 260 may display the live view on the display 230 by using the first data output from the first pixel group 310 included in the image sensor 210, combine the second data output from the second pixel group 320 included in the image sensor 210 with the first data to generate the photographing image, and store the generated photographing image on the storage 140.

Specifically, if an operation enters the continuous photographing mode, the controller 260 may perform the continuous photographing by using the first image processor 221 and the second image processor 225 and continuously display the live view on the display 230.

Figure 4:
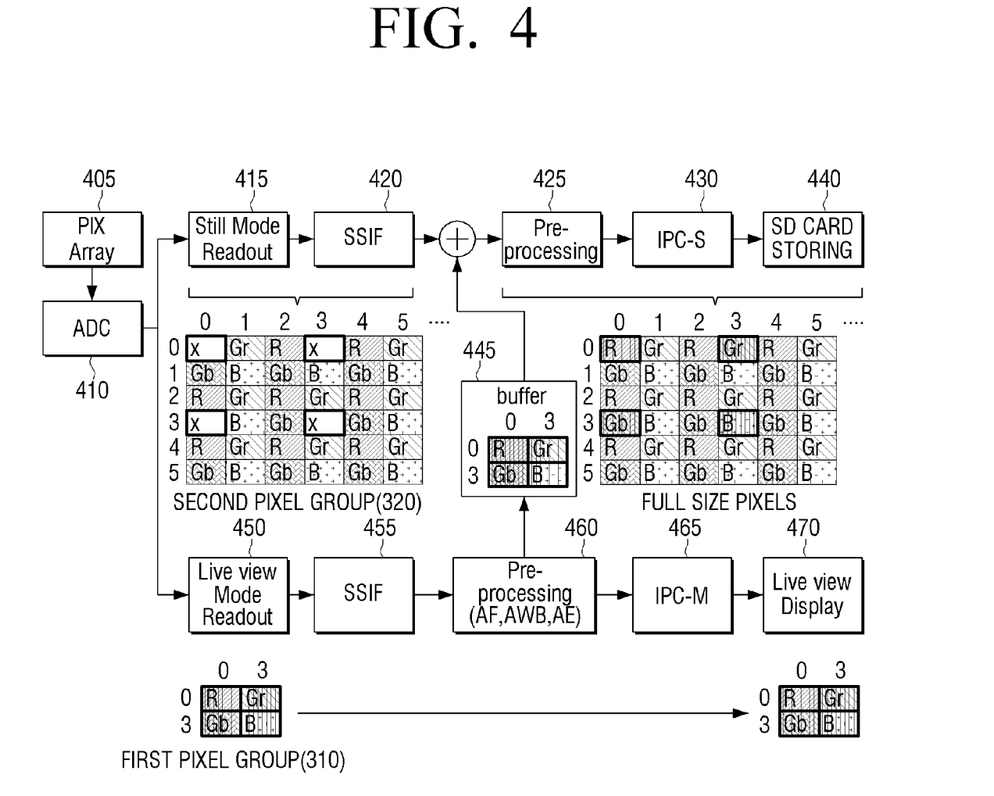
FIG. 4 is a diagram provided to explain in detail a method of processing the data output from an image sensor in continuous photographing according to an exemplary embodiment.

Referring to FIG. 4, a method at the controller to process image signals in response to an instruction to photograph in the continuous photographing mode will be described below.

If the instruction to photograph is input after entering the continuous photographing mode, the controller 260 may convert the optical signals input through the lens 205 to the electrical signals by using the pixel array 405 of the image sensor. The controller 260 may convert the analogue electrical signals to the digital data signals by using the ADC 410 of the image sensor 210.

The controller 260 may perform a live view mode readout 450 by using the first pixel group 310 to generate the live view, and generate the first data. The controller 260 may output the generated first data to the first image processor 220 via a sensor interface (SSIF) 420 which interfaces the image sensor 210 and the first image processor 221. The controller 260 may perform the pre-processing 460 of the first image processor 221. Referring to FIG. 4, the pre-processing may include the AF, the AWB, and the AE. The controller 260 may perform the IPC-M 465 of the pre-processed first data, and display the live view 470.

The controller 260 may control the first image processor 221 to temporarily store the pre-processed first data at the buffer 445.

While performing the live view mode readout 450 to generate the live view, the controller 260 may perform still mode readout 415 by using the second pixel group 320 in parallel with the live view mode readout 450, and generate the second data. The controller 260 may output the second data to the second image processor 225 through the SSIF 420 which interfaces the image sensor 210 and the second image processor 225. The controller 260 may combine the second data with the pre-processed first data and generate the full size data. The second data and the pre-processed first data may be the data that are photographed and acquired at the same time. The controller 260 may perform the pre-processing 425 of the full size data, perform the IPC-S 430, and store the signal-processed full size data at the storage 440, such as SD card.

The controller 260 may combine the first data and the second data according to the shutter speed (or the light exposure time) and the live view frame speed, and generate the full size data. Referring to FIGS. 5 to 8, the above operations will be described below.

Figure 5:
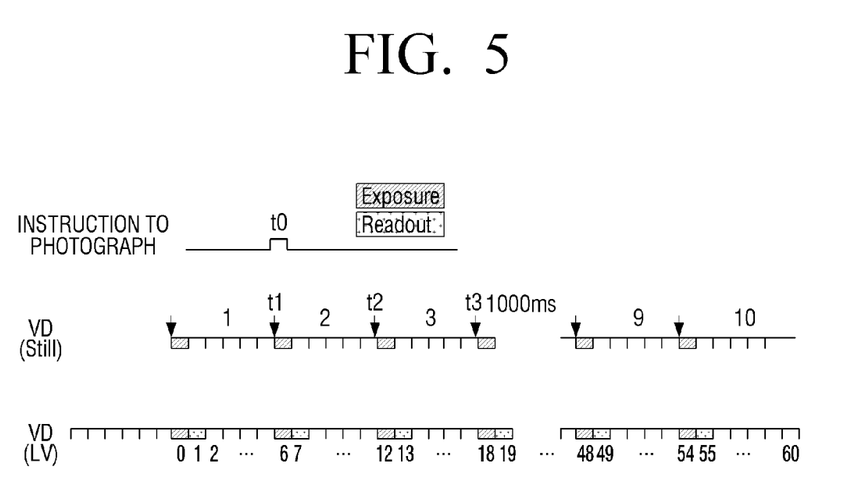
FIGS. 5 and 6 are diagrams provided to explain a method of processing the data output from an image sensor, when the speed of the live view frame is faster than the shutter speed according to an exemplary embodiment.
Figure 6:
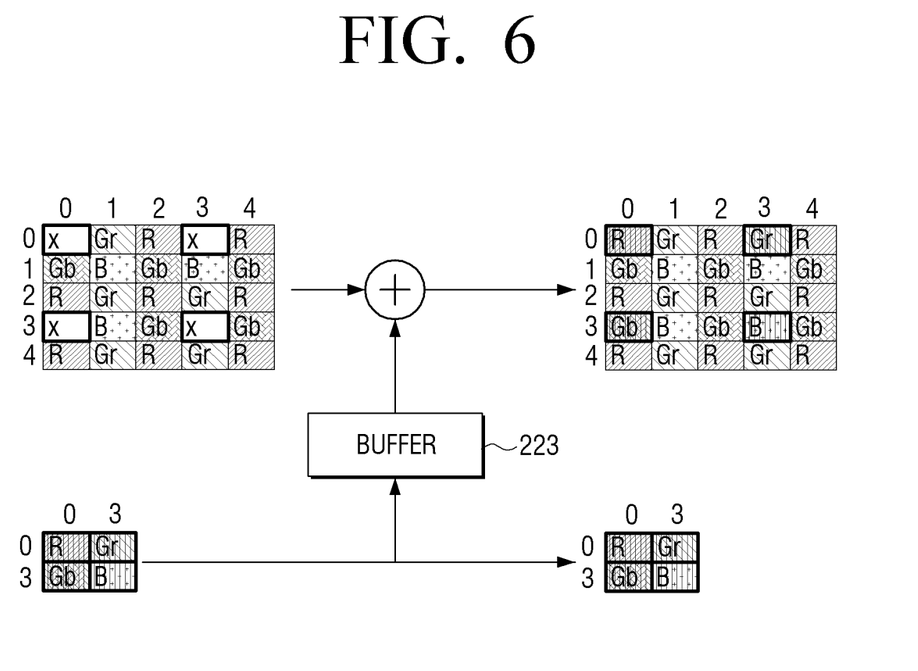

If the shutter speed is faster than the live view frame speed, the controller 260 may combine the second data with the first data acquired for the same duration as the exposure time of acquiring the second data, and generate the full size data.

For instance, if the live view frame speed is 1/60 of a second and the shutter speed is 1/60 of a second, upon input of the instruction to photograph at time t0, the controller 260 may expose the first pixel group and the second pixel group to the light from t0 for 1/60 of a second, and thus obtain the first data of one frame and the second data of one frame. For another 1/60 of a second after acquiring the data, the controller 260 may signal-process the first data readout by the first pixel group, and display the live view of one frame. In order to combine the first data and the second data at the concurrent time, the controller 260 may combine the second data acquired by exposing the second pixel group to the light from t0 for 1/60 of a second with the first data of one frame displayed in the live view for the next 1/60 of a second, and generate the full size data. That is, in response to an instruction to photograph, the controller 260 may store the first data to generate the live view of the next frame on the buffer, combine the stored first data with the second data photographed at the concurrent time, and generate the full size data. Because the first data to be displayed in the live view may be exposed for the same duration as the second data, the first data combined with the second data may be one frame data as illustrated in FIG. 6.

Figure 7:
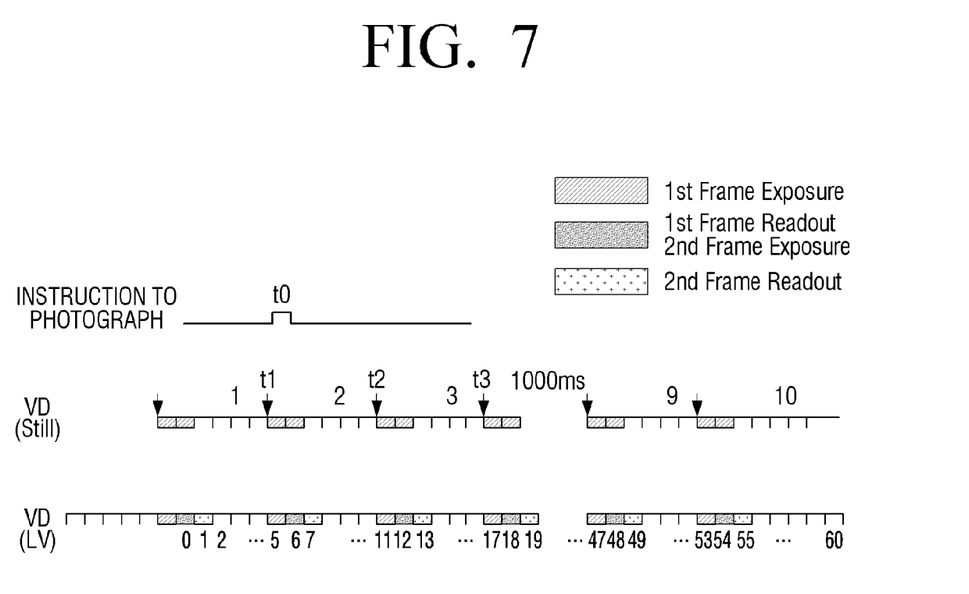
FIGS. 7 and 8 are diagrams to explain a method of processing the data output from an image sensor, when the speed of the live view frame is slower than the shutter speed according to an exemplary embodiment.
Figure 8:
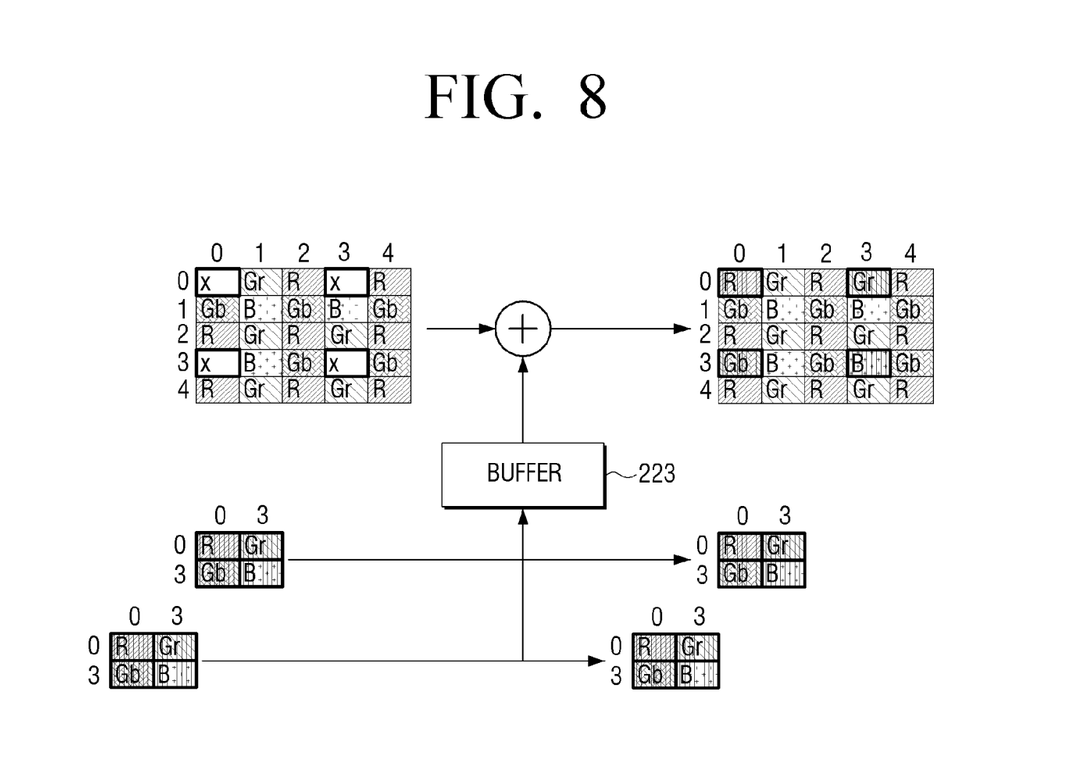

However, if the shutter speed is slower than the live view frame speed, the controller 260 may combine the second data with the first data of a plurality of frames acquired in the same duration as the exposure time applied to acquire the second data, and generate the full size data.

For instance, if the live view frame speed is 1/60 of a second, and the shutter speed is 1/30 of a second, upon input of the instruction to photograph at time t0, the controller 260 may acquire the second data by exposing the second pixel group to the light from t0 for 1/30 of a second, acquire the first data of one frame by exposing the first pixel group to the light from t0 for 1/60 of a second, signal-process the first data for the next 1/60 of a second, and display the live view (FIG. 7). In order to combine the first data and second data at a concurrent time, the controller 260 may combine the second data acquired by exposing the second pixel group to the light from t0 for 1/30 of a second with the first data of two frames to be displayed in the live view for 1/30 of a second, and generate the full size data. That is, upon input of an instruction to photograph, the controller 260 may store the first data of the two frames to generate the live view of the next frame at the buffer, combine the stored first data with the second data which is concurrently photographed, and generate the full size data (FIG. 8).

Referring to FIGS. 7 and 8, if the shutter speed is 1/30 of a second, the first data of the two frames may be combined with the second data. However, this is written only for illustrative purpose. Alternatively, the first data of a plurality of frames may be combined with the second data according to shutter speed. For instance, if the shutter speed is 1/15 of a second, the first data of four frames may be combined with the second data.

By using the photographing apparatus as described above, the user is continuously provided with the live view even after photographing. Specifically, in continuous photographing, since the user is provided with the live view through which he or she can check the moving subject of photography, the user is enabled to compose images as he or she wishes.

Figure 9:
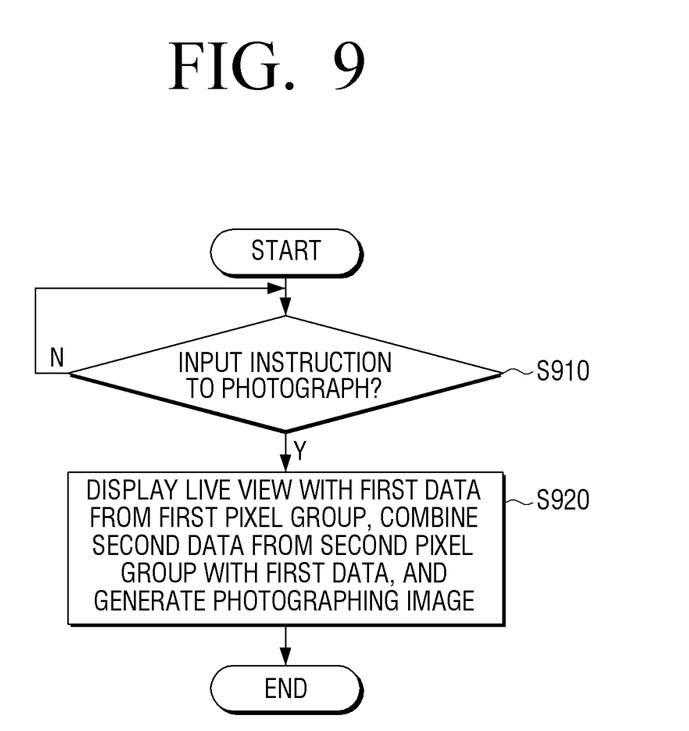
FIG. 9 is a flowchart to explain a photographing method of a photographing apparatus according to an exemplary embodiment.

Referring to FIG. 9, a photographing method of the photographing apparatus will be described below.

At operation S910, the photographing apparatus 100 may determine if an instruction to photograph is input. The instruction to photograph may be an instruction to perform continuous photographing.

If the instruction to photograph at operation is input as S910—Y, then at operation S920 the photographing apparatus 100 may display the live view by using the first data output from the first pixel group, combine the second data output from the second pixel group with the first data, and generate the photographing image.

Specifically, if the photographing instruction is input, the photographing apparatus 100 may output the first data and the second data acquired by the image sensor 110 to the image processor 120. The photographing apparatus 100 may signal-process and temporarily store the first data, and display the live view by using the signal-processed first data on the display 130. The photographing apparatus 100 may combine the second data with the temporarily stored first data, construct the full size data, signal-process the full size data, generate the photographing image, and store the photographing image at the storage 140. Particularly, if the instruction to photograph is an instruction to perform continuous photographing, the photographing apparatus 100 may continuously display the live view generated by the first data during the continuous photographing.

By using the photographing apparatus as described above, the user is continuously provided with the live view even after photographing. Specifically, in continuous photographing, since the user is provided with the live view through which he or she can check the moving subject of photography, the user is enabled to compose images as he or she wishes.

The programming codes to implement the photographing method according to various embodiments may be stored in the non-transitory computer readable medium. The non-transitory computer readable medium may indicate a medium that can store the data semi-permanently and can be read by a device, rather than a medium that stores data for a short time such as the register, a cache, or a memory. Specifically, the above-described applications or programs may be stored and provided in the non-transitory computer readable medium such as a CD, a DVD, a hard disk, a blue ray disk, a USB, a memory card, or a ROM.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing method of a photographing apparatus, the method comprising:
   determining whether an instruction to photograph is input; and
   if it is determined that the instruction to photograph is input, displaying a live view by using a first data output from a first pixel group included in an image sensor, and combining a second data output from a second pixel group included in the image sensor with the first data and generating a photographed image, and storing the generated photographed image,
   wherein no pixel in the first pixel group is included in the second pixel group, and
   wherein the instruction to photograph is an instruction to perform continuous photographing, and the live view is continuously displayed during the continuous photographing.

2. The photographing method of claim 1, wherein the storing comprises:
   if the instruction to photograph is input, outputting the first data and the second data acquired at the image sensor;
   signal-processing the first data and temporarily storing the processed first data, and displaying the live view using the processed first data; and
   combining the second data with the temporarily stored first data to construct full size data, signal-processing the full size data to generate photographed image, and storing the generated photographed image.

3. The photographing method of claim 2, wherein the constructing the full size data comprises, if a shutter speed is faster than a frame speed of the live view, combining the second data with the first data acquired for the same duration as an exposure time of acquiring the second data to construct the full size data.

4. The photographing method of claim 2, wherein, if a shutter speed is slower than a frame speed of the live view, the constructing the full size data comprises combining the second data with a plurality of first data generated for the same duration as an exposure time of acquiring the second data, to construct the full size data.

5. The photographing method of claim 2, wherein the displaying the live view and the storing the photographed image are performed in parallel.

6. The photographing method of claim 1, wherein the first pixel group comprises pixels at predetermined intervals from among entire constituent pixels of the image sensor to generate the live view, and
   the second pixel group comprises pixels other than the first pixel group of the entire constituent pixels of the image sensor.

7. A photographing apparatus, comprising:
   an input which receives an instruction to photograph;
   an image sensor comprising a first pixel group and a second pixel group;
   an image processor which processes data output by the image sensor;
   a display which displays the processed data;
   a storage which stores the processed image; and
   a controller which displays the live view on the display by using first data output from the first pixel group included in the image sensor, combines second data output from the second pixel group included in the image sensor with the first data to generate the photographed image, and stores the generated photographed image at the storage, if the instruction to photograph is input through the input,
   wherein no pixel in the first pixel group is included in the second pixel group, and
   wherein the instruction to photograph is an instruction to perform continuous photographing, and the live view is continuously displayed during the continuous photographing.

8. The photographing apparatus of claim 7, wherein the image processor comprises a first image processor which signal-processes the first data and a second image processor which signal-processes full size data combining the first data and the second data.

9. The photographing apparatus of claim 8, wherein,
the image sensor outputs the acquired first and second data, if the instruction to perform continuous photographing is input through the input, and
the controller controls the first image processor to signal-process the first data, temporarily stores the signal-processed first data at a buffer, displays the live view of the signal-processed first data on the display, combines the second data with the temporarily stored first data to construct the full size data, controls the second image processor to signal-process the full size data to generate the photographing image, and stores the generated photographing image on the storage.

10. The photographing apparatus of claim 8, wherein, if a shutter speed is faster than a frame speed of the live view, the controller combines the second data with first data acquired for the same duration as an exposure time of acquiring the second data, and generates the full size data.

11. The photographing apparatus of claim 8, wherein, if a shutter speed is slower than a frame speed of the live view, the controller combines the second data with a plurality of first data acquired for the same duration as an exposure time of acquiring the second data, and generates the full size data.

12. The photographing apparatus of claim 8, wherein the controller performs in parallel displaying the live view by using the first data, generating the photographed image by using the full size data, and storing the generated photographed image.

13. The photographing apparatus of claim 7, wherein the first pixel group comprises pixels at predetermined intervals from among entire constituent pixels of the image sensor to generate the live view, and the second pixel group comprises remaining pixels other than the first pixel group of the entire constituent pixels of the image sensor.

14. A photographing apparatus, comprising:
an image processor which processes data from a first pixel group and data from a second pixel group;
a display which displays the processed data as an image;
a storage which stores the processed data; and
a controller which displays a live view on the display by using first data output from the first pixel group, combines second data output from the second pixel group with the first data to generate a photographed image, and stores the generated photographed image at the storage, if the instruction to photograph is received,
wherein no pixel in the first pixel group is included in the second pixel group, and
wherein the instruction to photograph is an instruction to perform continuous photographing, and the live view is continuously displayed during the continuous photographing.

15. The photographing apparatus of claim 14, wherein the image processor comprises:
a first image processor which signal-processes the first data; and
a second image processor which signal-processes full size data combining the first data and the second data.

16. The photographing apparatus of claim 15, wherein, if the instruction to perform continuous photographing is received, the controller controls the first image processor to signal-process the first data, temporarily stores the signal-processed first data at a buffer, displays the live view of the signal-processed first data on the display, combines the second data with the temporarily stored first data to construct the full size data, controls the second image processor to signal-process the full size data to generate the photographing image, and stores the generated photographing image at the storage.

17. The photographing apparatus of claim 14, wherein the first pixel group comprises pixels at predetermined intervals from among entire constituent pixels of an image sensor to generate the live view, and the second pixel group comprises remaining pixels other than the first pixel group of the entire constituent pixels of the image sensor.

* * * * *